United States Patent
McCarty et al.

(10) Patent No.: US 11,799,709 B2
(45) Date of Patent: Oct. 24, 2023

(54) SYSTEMS AND METHODS FOR INSERTING SUPPLEMENTAL CONTENT INTO A QUADRATURE AMPLITUDE MODULATION SIGNAL USING EXISTING BANDWIDTH

(71) Applicant: Rovi Guides, Inc., San Jose, CA (US)

(72) Inventors: Michael McCarty, Agoura Hills, CA (US); Glen E. Roe, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/117,157

(22) Filed: Mar. 3, 2023

(65) Prior Publication Data

US 2023/0283509 A1 Sep. 7, 2023

Related U.S. Application Data

(63) Continuation of application No. 17/689,106, filed on Mar. 8, 2022, now Pat. No. 11,621,880, which is a continuation of application No. 16/834,581, filed on Mar. 30, 2020, now Pat. No. 11,303,496.

(51) Int. Cl.
*H04L 27/36* (2006.01)
*H04L 47/80* (2022.01)
*H04L 67/01* (2022.01)

(52) U.S. Cl.
CPC ............ *H04L 27/36* (2013.01); *H04L 47/801* (2013.01); *H04L 67/01* (2022.05)

(58) Field of Classification Search
CPC ........ H04L 27/36; H04L 47/801; H04L 67/01
See application file for complete search history.

(56) References Cited

U.S. PATENT DOCUMENTS

| | | | |
|---|---|---|---|
| 8,116,616 B2 | 2/2012 | Plotnick et al. | |
| 9,124,947 B2 | 9/2015 | Bjordammen et al. | |
| 11,621,880 B2 | 4/2023 | McCarty et al. | |
| 2007/0022032 A1 | 1/2007 | Anderson et al. | |
| 2013/0268984 A1 | 10/2013 | Salinger et al. | |
| 2015/0163559 A1 | 6/2015 | Manchester et al. | |
| 2020/0279027 A1* | 9/2020 | Gould | G06Q 30/0248 |
| 2021/0021407 A1* | 1/2021 | Weerasinghe | H04L 9/3239 |
| 2021/0306199 A1 | 9/2021 | McCarty et al. | |
| 2022/0191082 A1 | 6/2022 | McCarty et al. | |

* cited by examiner

*Primary Examiner* — Kabir A Timory
(74) *Attorney, Agent, or Firm* — HALEY GUILIANO LLP

(57) ABSTRACT

Systems and methods are described herein for inserting supplemental content into a QAM signal. A unicast QAM signal between a server and a client device for delivery of content is established. The QAM signal has a particular frequency corresponding to the channel on which it will be transmitted to the client device. A request or other signal may be received from the client device requesting that supplemental content be inserted into the QAM signal. A portion of the bandwidth of the QAM signal is allocated for the supplemental content. The supplemental content is transcoded into a supplemental QAM signal in the particular frequency. The supplemental content may be packetized content such as internet protocol-based content and may be retrieved from a server or database. The supplemental QAM signal is then inserted into the unicast QAM signal using the allocated portion of the bandwidth.

20 Claims, 7 Drawing Sheets

SYSTEMS AND METHODS FOR INSERTING SUPPLEMENTAL CONTENT INTO A QUADRATURE AMPLITUDE MODULATION SIGNAL USING EXISTING BANDWIDTH

CROSS-REFERENCE TO RELATED APPLICATIONS

This application is a continuation of U.S. patent application Ser. No. 17/689,106, filed Mar. 8, 2022, which is continuation of U.S. patent application Ser. No. 16/834,581, filed Mar. 30, 2020, now U.S. Pat. No. 11,303,496, which are hereby incorporated by reference herein in their entireties.

BACKGROUND

This disclosure relates to insertion of content into a quadrature amplitude modulation (QAM) signal and, in particular, insertion of the content utilizing the existing bandwidth of the channel in which the QAM signal is transmitted.

SUMMARY

Cable television operators often face bandwidth constraints due to protocol standards used in cable television transmission. Every channel in a cable television system is allocated a 6 MHz-wide portion of the total cable television frequency range, and content is encoded in a QAM signal in the frequency of the particular channel In order to provide the maximum amount of content to subscribers, cable television operators use every available channel for either linear programming or on-demand programming. As cable television systems evolve, cable television operators want to be able to offer additional features. For these additional features to be available to all subscribers, they must be accessible using legacy equipment. This means that any additional feature must be transmitted to subscribers using one of the 6 MHz channels, and not using over-the-top or internet-based infrastructure. However, the amount of bandwidth available to provide such features is limited.

Systems and methods are described herein for inserting supplemental content into a QAM signal. A unicast QAM signal between a server (e.g., a cable television headend) and a client device (e.g., a set-top box) for delivery of content is established. The QAM signal has a particular frequency corresponding to the channel on which it will be transmitted to the client device. A request or other signal may be received from the client device requesting that supplemental content be inserted into the QAM signal. A portion of the bandwidth of the QAM signal is allocated for the supplemental content. The supplemental content is transcoded into a supplemental QAM signal in the particular frequency. The supplemental content may be packetized content such as internet protocol-based content and may be retrieved from a server or database. The supplemental QAM signal is then inserted into the unicast QAM signal using the allocated portion of the bandwidth.

For example, the supplemental content may be an advertisement. While playing back content received via the unicast QAM signal, such as video-on-demand content, the client device may identify an advertisement insertion point in the content and request an advertisement to be inserted. The QAM encoding device serving the unicast QAM session may then allocate a portion of bandwidth in the unicast QAM signal for the advertisement to be inserted without disruption of the video-on-demand content.

To establish the unicast QAM signal, a request for content is received from the client device. The requested content is retrieved from a content database and encoded as a QAM signal in the frequency of the unicast QAM signal. The QAM signal is then communicated from the server to the client device.

A dedicated processing device may be used to transcode the packetized supplemental content into a supplemental QAM signal. For example, the packetized supplemental content may be an IP-based advertisement. The dedicated processing device may be an ad pump which may be controlled by an ad session manager. A number of dedicated processing devices may be available to perform the transcoding. For example, a cable television headend may house a pool of ad pumps for delivering multiple ads simultaneously to various client devices over various QAM signals. In some cases, the available dedicated processing devices are identified, and a current workload of each device is determined. The dedicated processing device whose current workload is less than that of every other available dedicated processing device is then allocated to the task of transcoding the supplemental content. In other cases, a service group to which the client device belongs is identified and it is determined whether any of the available dedicated processing devices is currently serving that service group. If so, the particular dedicated processing device currently serving the service group is allocated to the task of transcoding the supplemental content.

Allocation of a portion of bandwidth of the QAM signal may be based on a determination of an amount of bandwidth needed to accommodate the supplemental content. In some cases, a total amount of bandwidth of the QAM signal is identified and an amount of bandwidth needed for delivery of the content is determined. A number of programs currently being transmitted in the QAM signal are identified, and the amount of bandwidth used by at least one of the programs is reduced. For example, the bitrate of the content may be lowered so that less bandwidth is required to transmit the content. If the amount by which the bandwidth used by the at least one program has been reduced is greater than or equal to the amount of bandwidth needed for delivery of the supplemental content, the amount of bandwidth needed for delivery of the supplemental content is allocated from the amount of bandwidth recovered from the reduction of bandwidth usage by the at least one program. If the amount by which the bandwidth used by the at least one program has been reduced is less than the amount of bandwidth needed for delivery of the supplemental content, it may be determined whether the amount of bandwidth needed for delivery of the supplemental content can be reduced to a second amount of bandwidth that is less than or equal to the amount by which the bandwidth used by the at least one program has been reduced. If it can be reduced, the supplemental content is transcoded to use the second amount of bandwidth and the second, reduced amount of bandwidth is allocated from the amount of bandwidth recovered from the reduction of bandwidth usage by the at least one program for delivery of the supplemental content. If the amount of bandwidth needed for delivery of the supplemental content cannot be reduced, then no bandwidth is allocated and no supplemental content is inserted into the unicast QAM signal.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
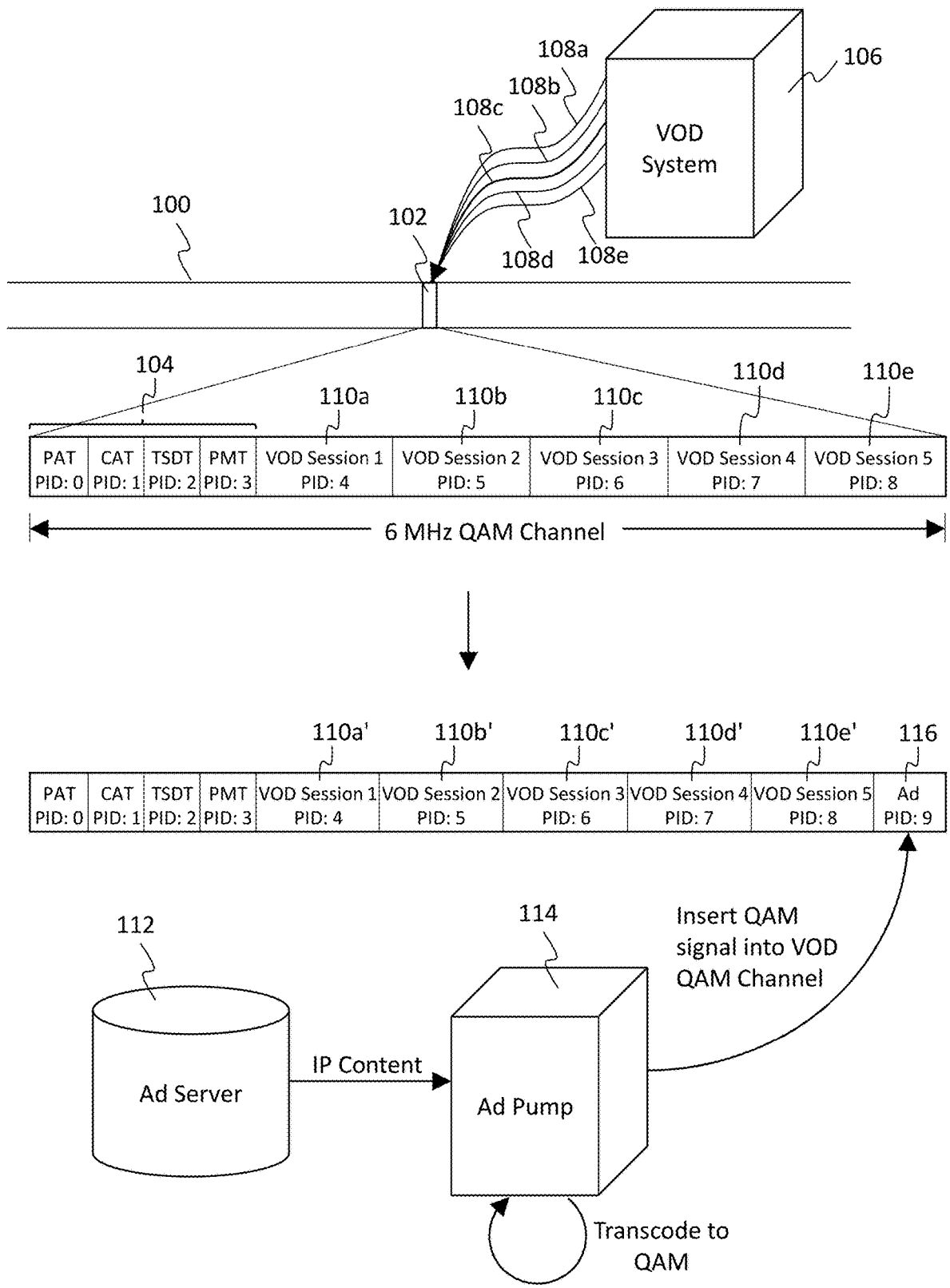
FIG. 1 is a schematic diagram representing insertion of supplemental content into a QAM signal using available bandwidth, in accordance with some embodiments of the disclosure.

FIG. 1 is a schematic diagram representing insertion of supplemental content into a QAM signal using available bandwidth, in accordance with some embodiments of the disclosure. A cable television frequency band 100 is divided into a number of channels, such as channel 102. Each channel is normally 6 MHz wide and can accommodate a certain number of programs transmitted simultaneously. For example, a single 6 MHZ-wide channel may simultaneously deliver programming for NBC, MSNBC, CNBC, SyFy, and USA Network. Some channels are left open for unicast transmissions of video-on-demand (VOD) content to individual subscribers. Channel 102 is an example of a VOD channel A portion 104 of channel 102 is dedicated to control metadata. For example, channel 102 may contain an MPEG-2 transport stream in a QAM format. Portion 104 may contain the Program Association Table, Conditional Access Table, Transport Stream Description Section, and Program Map Section, each of which includes data used by the client device to successfully access content contain in the MPEG-2 stream. Each component of the MPEG-2 stream is identified by a program identifier (PID), which the client device uses a filter to ensure that only packets pertaining to a selected program are decoded for output. In the example of FIG. 1, channel 102 is a VOD channel and receives VOD content from VOD system 106. VOD system 106 transmits VOD content items 108*a*-108*e* for inclusion in channel 102. Thus, channel 102 contains five VOD sessions 110*a*-110*e*. The combined bandwidth required for transmitting the control metadata of portion 104 and the five VOD sessions 110*a*-110*e* uses the entirety of the 6 MHz available in channel 102.

During delivery of the VOD content, supplemental content such as advertisements may be inserted into the transmission. Ad server 112 may store ads in an IP-based or packetized format that is not compatible with QAM signaling. Ad pump 114 receives the packetized ad content from ad server 112 and transcodes the ad content into a supplemental QAM signal in the same frequency band as that of channel 102. VOD system 106 may be instructed to reduce, or attempt to reduce, the bandwidth needed for delivery of at least one of VOD programs 108*a*-108*e*. For example, VOD system 106 may be instructed to reduce the bitrate of at least one VOD program. In the example of FIG. 1, VOD system 106 has reduces the bandwidth needed for delivery of all VOD programs 108*a*-108*e*, resulting in reduced bandwidth VOD sessions 110*a'* to 110*e'*, leaving a portion of bandwidth of channel 102 available for insertion of supplemental content. Ad pump 114 then inserts the supplemental QAM signal into the available portion of bandwidth of channel 102. In some embodiments, it may first be determined whether the ad content, when transcoded into the supplemental QAM signal, will fit within the available portion of bandwidth of channel 102. If not, ad pump 114 may determine if the bandwidth requirements can be reduced, such as by lowering the quality or bitrate of the ad content. If so, ad pump 114 transcodes the packetized ad content into the supplemental QAM signal having the reduced bandwidth. If it is not possible to reduce the bandwidth, no ad will be inserted, as delivery of the VOD content is prioritized over delivery of the ad content.

Figure 2:
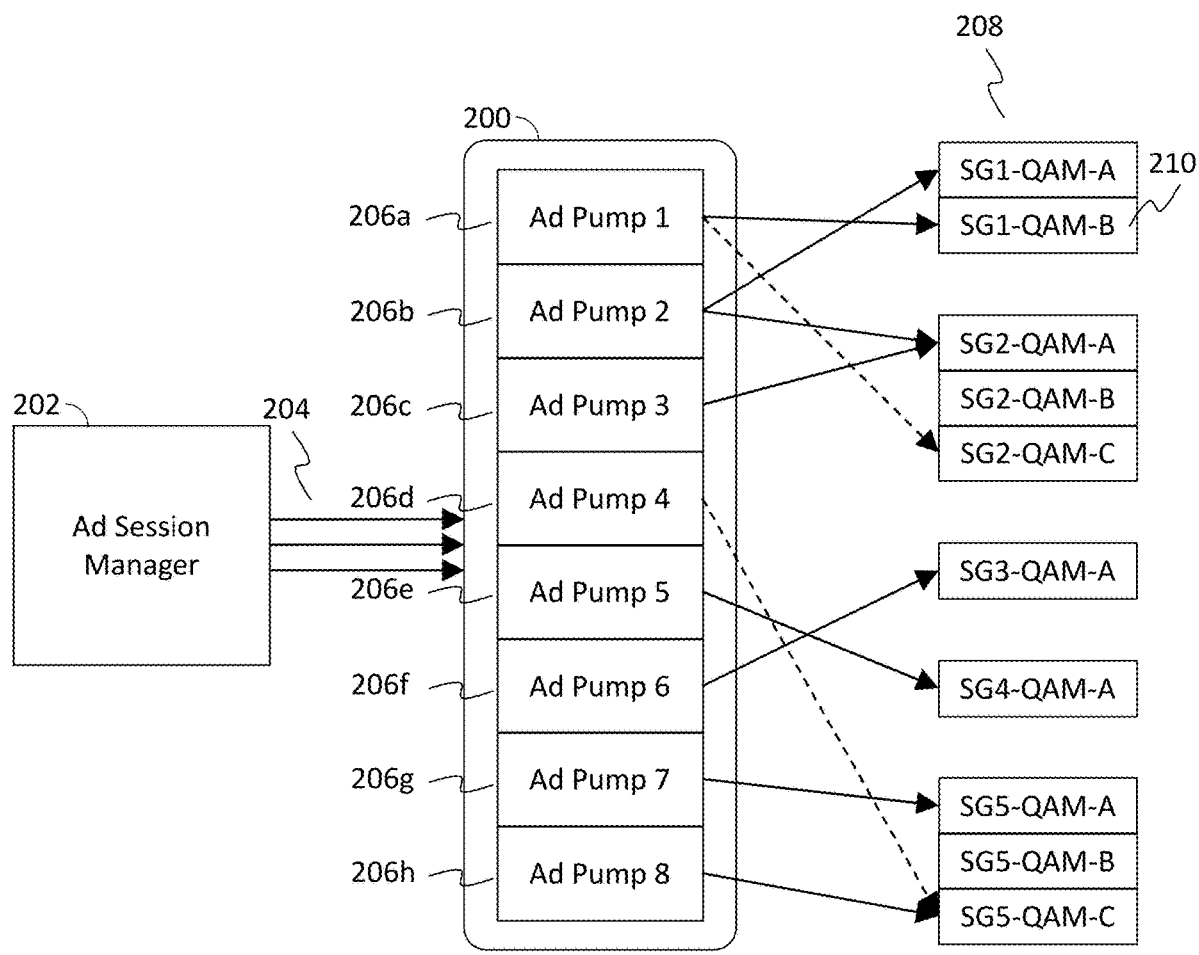
FIG. 2 is a block diagram showing allocation of each of a pool of ad pumps by an ad session manager to transcode supplemental content, in accordance with some embodiments of the disclosure.

FIG. 2 is a block diagram showing allocation of each of a pool of ad pumps 200 by an ad session manager 202 to transcode supplemental content, in accordance with some embodiments of the disclosure. Pool 200 may be located at a cable television headend. Ad session manager 202 may also be located at the cable television headend, or may be located remotely from the cable television headend and accessible via a communication network, such as the Internet. Ad session manager 202 is responsible for allocating one of ad pumps 206*a*-206*h* of pool 200 to transcoding supplemental content for various client devices. In some cases, ad session manager 202 may assign or allocate a particular ad pump based on current workloads of each of ad pumps 206*a*-206*h*, so that transcoding tasks are spread evenly across pool 200. For example, three tasks may currently be allocated to ad pump 1 206*a*, while four tasks may currently be allocated to each of ad pumps 2-8 (206*b*-206*h*). Ad pump 1 206*a* would thus have the smallest current workload, and ad session manager 202 therefore allocates ad pump 1 206*a* to the task of transcoding the supplemental content.

In some embodiments, a plurality of client devices being served by pool 200 may be divided into a number of service groups 208. Ad session manager 202 transmits 204 instructions to ad pump pool 200 allocating each of ad pumps 1-8 (206*a*-206*h*) to a transcoding task based on the service group of the client device to which the supplemental content is to be delivered. For example, ad pump 1 206*a* is currently transcoding supplemental content destined for a client device in service group SG1-QAM-B 210. If another client device in the same service group requests supplemental content, ad session manager 202 will allocate ad pump 1 206*a* to the task of transcoding the requested supplemental content.

Figure 3:
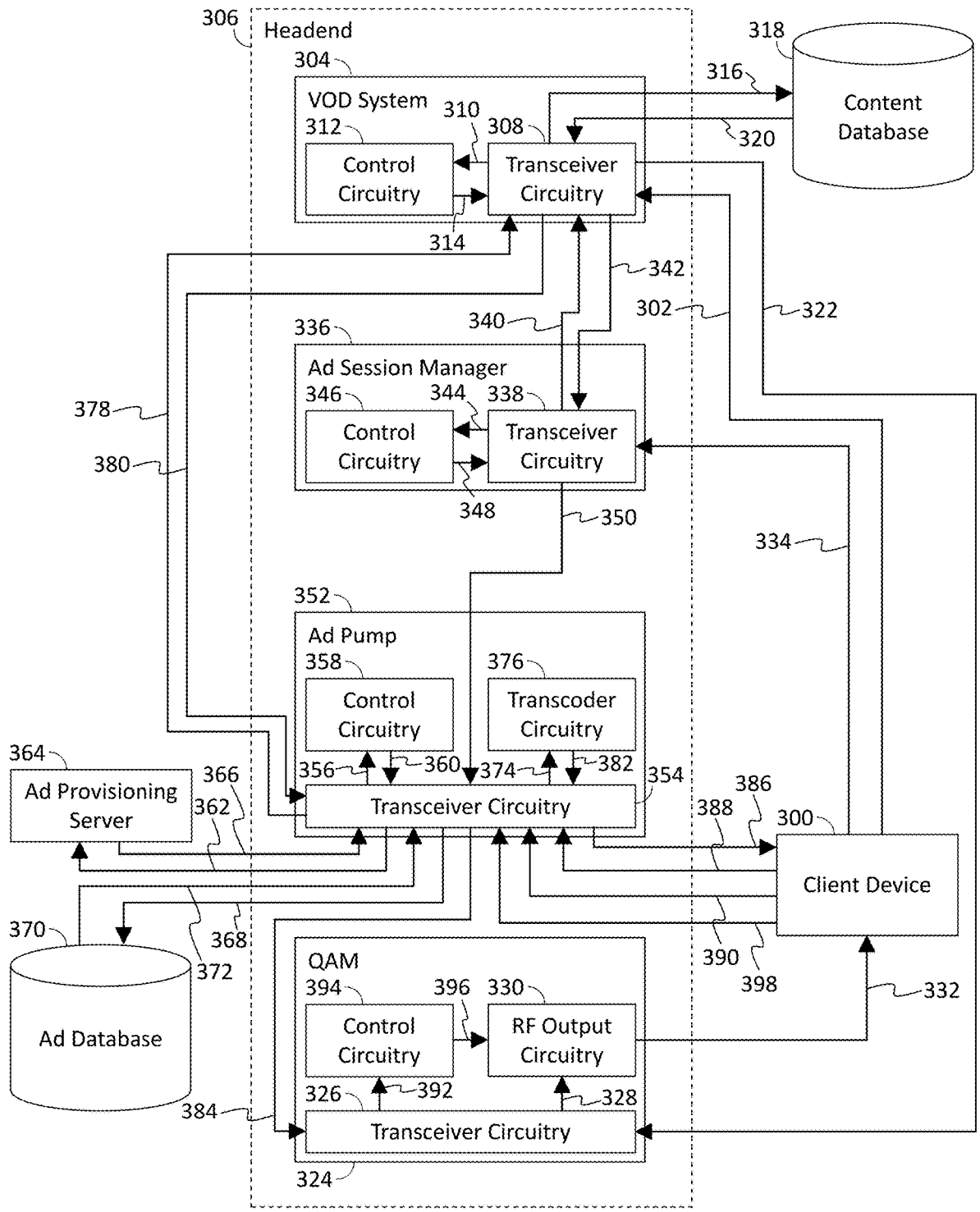
FIG. 3 is a block diagram representing components and data flow therebetween of a system for inserting supplemental content into a QAM signal using available bandwidth, in accordance with some embodiments of the disclosure.

FIG. 3 is a block diagram representing components and data flow therebetween of a system for inserting supplemental content into a QAM signal using available bandwidth, in accordance with some embodiments of the disclosure. Client device 300 transmits 302 a request for VOD content from VOD system 304. VOD system 304 is located at headend 306. VOD system 304 receives the request from client device 300 using transceiver circuitry 308. Transceiver circuitry 308 comprises a network connection over which data can be transmitted to and received from client devices in a cable television ecosystem, such as an ethernet connection, WiFi connection, coaxial connection, fiber optic connection, or connection employing any other suitable networking protocol. The request may identify a particular content item using at least one identifier of the content item. Transceiver circuitry 308 transmits 310 the request to control circuitry 312. Control circuitry 312 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 312 processes the request and generates a database query, such as an SQL "SELECT" command, based on the identifier of the content item contained in the request. Control circuitry 312 then transmits 314 the database query to transceiver circuitry 308, which in turn transmits 316 the query to content database 318. Transceiver circuitry 308 receives 320 the identified content item from content database 318 and begins streaming 322 the content item to QAM 324 in a QAM format. QAM 324 may also be located at headend 306. QAM 324 receives the streaming content from VOD system 304 using transceiver circuitry 326. Like transceiver circuitry 308, transceiver circuitry 326 comprises a network connection over which data can be transmitted to and received from client devices in a cable television ecosystem, such as an ethernet connection, WiFi connection, coaxial connection, fiber optic connection, or connection employing any other suitable networking protocol. Transceiver circuitry 326 transmits 328 the VOD content stream to RF output circuitry 330. RF output circuitry 330 places a QAM signal of the VOD content on a unicast QAM channel in a session associated with client device 300. RF output circuitry 330 then transmits 332 the QAM signal of the VOD content to client device 300.

During playback of the VOD content, client device 300 identifies an ad insertion point in the VOD content. For example, the VOD content may include command tags, metadata, or other indicators that signal an upcoming ad insertion point. In response to identifying the ad insertion point, client device 300 transmits 334 a request to ad session manager 336 for an ad to be inserted. Ad session manager 336 may be located at headend 306. As session manager 336 receives the request using transceiver circuitry 338, which comprises a network connection over which data can be transmitted to and received from client devices in a cable television ecosystem, such as an ethernet connection, WiFi connection, coaxial connection, fiber optic connection, or connection employing any other suitable networking protocol. In response to receiving the request, ad session manager 336, using transceiver circuitry 338, transmits 340 a request to VOD system 304 for session information associated with client device 300. VOD system 304, using transceiver circuitry 308, transmits 342 the requested session information to ad session manager 336. Transceiver circuitry 338, upon receiving the session information, transmits 344 the session information to control circuitry 346. Like control circuitry 312, control circuitry 346 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 346 processes the request and identifies an available ad pump to allocate to the request. As described above, control circuitry 346 may allocate an ad pump having the smallest current workload of a plurality of available ad pumps. Alternatively, control circuitry 346 may determine from the request a service group to which client device 300 belongs and allocate an ad pump currently serving client devices in the same service group. If no ad pump is currently serving a client device in the same service group as client device 300, control circuitry 346 may allocate an ad pump based on workloads. Control circuitry 346 transmits 348 an allocation command, as well as the session information, to transceiver circuitry 338, which in turn transmits 350 the allocation command and session information to ad pump 352. Ad pump 352 receives the allocation command and session information using transceiver circuitry 354 which, like transceiver circuitry 338, comprises a network connection over which data can be transmitted to and received from client devices in a cable television ecosystem, such as an ethernet connection, WiFi connection, coaxial connection, fiber optic connection, or connection employing any other suitable networking protocol. Transceiver circuitry 354 transmits 356 the allocation command to control circuitry 358, which processes the allocation command. Control circuitry 358, like control circuitry 312 and control circuitry 346, may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 358 generates a request for an ad based on the allocation command. For example, control circuitry 358 may generate an HTTP request for transmission to a server. Control circuitry 358 transmits 360 the request to transceiver circuitry 354, which in turn transmits 362 the request to ad provisioning server 364. In response to the request, ad pump 352, using transceiver circuitry 354, receives 366, from ad provisioning server 364, an identifier of an ad to be inserted into the VOD content. Transceiver circuitry 354 then transmits 368 the identifier to ad database 370. In response, ad pump 352, using transceiver circuitry 354, receives 372 packetized ad content from ad database 370. Transceiver circuitry 354 transmits 374 the packetized ad content to transcoder 376. Transcoder 376, using the session information received from VOD system 304 via ad session manager 336, transcodes the packetized ad content into a supplemental QAM signal in the frequency of the unicast QAM signal over which the VOD content is being streamed to client device 300.

Ad pump 352, using transceiver circuitry 354, transmits a command to VOD system 304 to reduce the amount of bandwidth used by at least one program in the QAM signal. VOD system 304 determines, using control circuitry 312, whether the bandwidth needed to deliver any program in the QAM signal can be reduced, for example, by reducing the bitrate of the content. In some embodiments, ad pump 352 may include the amount of bandwidth needed for delivery of the supplemental content as part of the command. VOD system 304 may divide the amount of bandwidth needed evenly among the programs contained in the QAM signal and reduce the bandwidth needed for each program accordingly. This would result in the least noticeable degradation of quality by users consuming the VOD content being delivered in the QAM signal. VOD system 304 then transmits 380 a signal to ad pump 352 indicating the amount of bandwidth recovered through the reduction process. Ad pump 352 receives the signal using transceiver circuitry 354 and determines if the amount of bandwidth recovered is sufficient for delivery of the supplemental content. If so, he supplemental QAM signal is transmitted 382 to transceiver circuitry 354, which initializes a transmission path 384 for the supplemental QAM signal between ad pump 352 and QAM 324.

After preparing the supplemental QAM signal, ad pump 352, using transceiver circuitry 354, transmits 386 a signal to client device 300 providing tuning information for the inserted ad. For example, while the supplemental QAM signal may be placed into the same QAM channel as the VOD content, the client device may have to access a different program within the channel (i.e., PID) to generate the supplemental QAM signal for display. Ad pump 352 may inform client device 300 of the PID that client device 300 can use to access the supplemental QAM signal. Once the client device has performed a corresponding tuning operation, ad pump 352, using transceiver circuitry 354, receives 388 from client device 300 a start command, indicating to ad pump 352 that client device 300 is ready to begin viewing the supplemental QAM signal. Ad pump 352 may also receive 390 an indication that client device 300 has received a first frame of the program in which the supplemental QAM signal is placed. In response, ad pump 352, using transceiver circuitry 354, provides the supplemental QAM signal over transmission path 384 to QAM 324.

QAM 324 receives the supplemental QAM signal using transceiver circuitry 326, which in turn transmits 392 the supplemental QAM signal to control circuitry 394. Control circuitry 394, like control circuitry 312, control circuitry 346, and control circuitry 358, may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Control circuitry 394 identifies the RF frequency corresponding to the QAM channel over which the supplemental QAM signal is to be sent. For example, control circuitry 394 may access a table of QAM channels and their respective frequencies. Once the proper frequency is identified, control circuitry 394 transmits 396 the supplemental QAM signal and an RF tuning command to RF output circuitry 330, which inserts the supplemental QAM signal into the unicast QAM signal over which the VOD content is being transmitted 332 to client device 300.

Ad pump 352 may receive 398, from client device 300, an indication of whether the ad was displayed in its entirety or if the ad was skipped by the user. This information may be used, for example, to target other ads to the user. Alternatively, if the ad was not delivered successfully, ad pump 352 may receive an indication from client device 300 that the ad was aborted. This information may be used for diagnostic purposes if a large number of ads are indicated as having been aborted.

While shown and described separately in FIG. 3, it should be understood that control circuitry 312, control circuitry 346, control circuitry 358, and control circuitry 394, or any combination thereof, may be combined or implemented on master control circuitry at headend 306. For example, control circuitry of one or more master control servers may coordinate the operations of VOD system 304, ad session manager 336, ad pump 352, and QAM 324.

Figure 4:
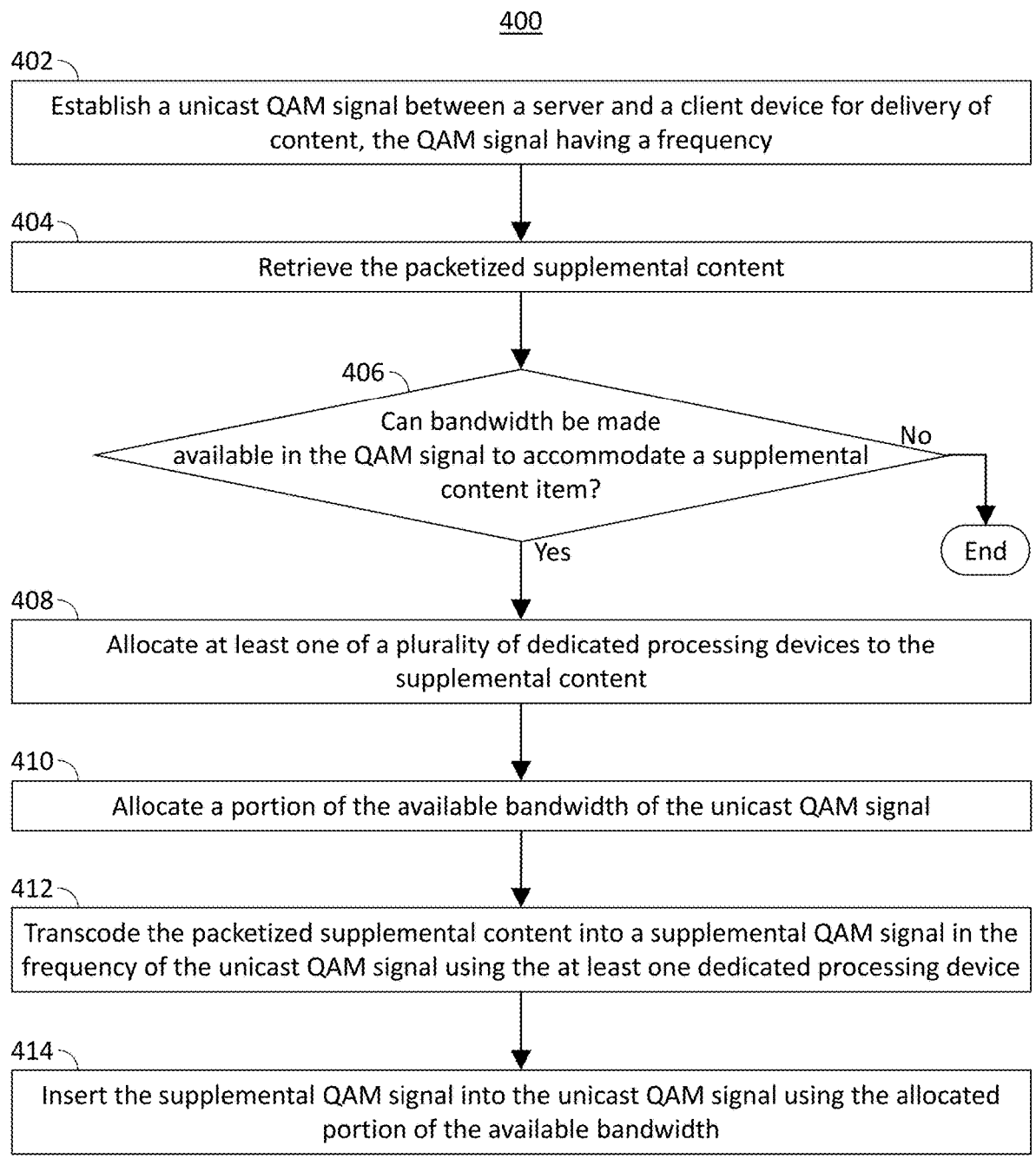
FIG. 4 is a flowchart representing a process for inserting supplemental content into a QAM signal using available bandwidth, in accordance with some embodiments of the disclosure.

FIG. 4 is a flowchart representing an illustrative process 400 for inserting supplemental content into a QAM signal using available bandwidth, in accordance with some embodiments of the disclosure. Process 400 may be implemented on control circuitry of a master control server or any one or more of control circuitry 312, control circuitry 346, control circuitry 358, and control circuitry 394. In addition, one or more actions of process 400 may be incorporated into or combined with one or more actions of any process or embodiments described herein.

At 402, control circuitry (e.g., control circuitry 394 or control circuitry of a master control server) establishes a unicast QAM signal between a server and a client device for delivery of content, the QAM signal having a frequency. For example, a QAM signal targeted to the client device is placed on a QAM channel reserved for unicast VOD transmissions. VOD content is then encoded as a QAM signal in the frequency band of the QAM channel so that the VOD content can be transmitted over that channel to the client device. At 404, control circuitry (e.g., control circuitry 358 or control circuitry of a master control server) retrieves packetized supplemental content for insertion into the QAM channel For example, supplemental content such as an ad may be retrieved from an ad server or ad database.

At 406, control circuitry (e.g., control circuitry 312, control circuitry 346, control circuitry 394, or control circuitry of a master control server) determines bandwidth can be made available in the QAM signal to accommodate a supplemental content item. This may be accomplished using methods described below in connection with FIG. 8. If bandwidth can be made available ("Yes" and 406), then, at 408, control circuitry (e.g., control circuitry 346 or control circuitry of a master control server) allocates at least one of a plurality of dedicated processing devices to the supplemental content. This may be accomplished using methods described below in connection with FIG. 7. At 410, control circuitry (e.g., control circuitry 346, control circuitry 390, or control circuitry of a master control server) allocates a portion of the available bandwidth of the unicast QAM signal for insertion of the supplemental content. For example, control circuitry may insert a new PID corresponding to the supplemental content into a program association table or program map section of the QAM signal.

At 412, control circuitry (e.g., control circuitry 358 or control circuitry of a master control server) transcodes the packetized supplemental content into a supplemental QAM signal in the frequency of the unicast QAM signal using the at least one dedicated processing device. For example, the packetized data comprising the supplemental content is converted into a format compatible with quadrature amplitude modulation, such as an MPEG-2 transport stream. At 414, control circuitry (e.g., control circuitry 346, control circuitry 358, control circuitry 390, or control circuitry of a master control server) inserts the supplemental QAM signal into the unicast QAM signal using the allocated portion of the available bandwidth.

The actions or descriptions of FIG. 4 may be used with any other embodiment of this disclosure. In addition, the actions and descriptions described in relation to FIG. 4 may be done in any suitable alternative orders or in parallel to further the purposes of this disclosure.

Figure 5:
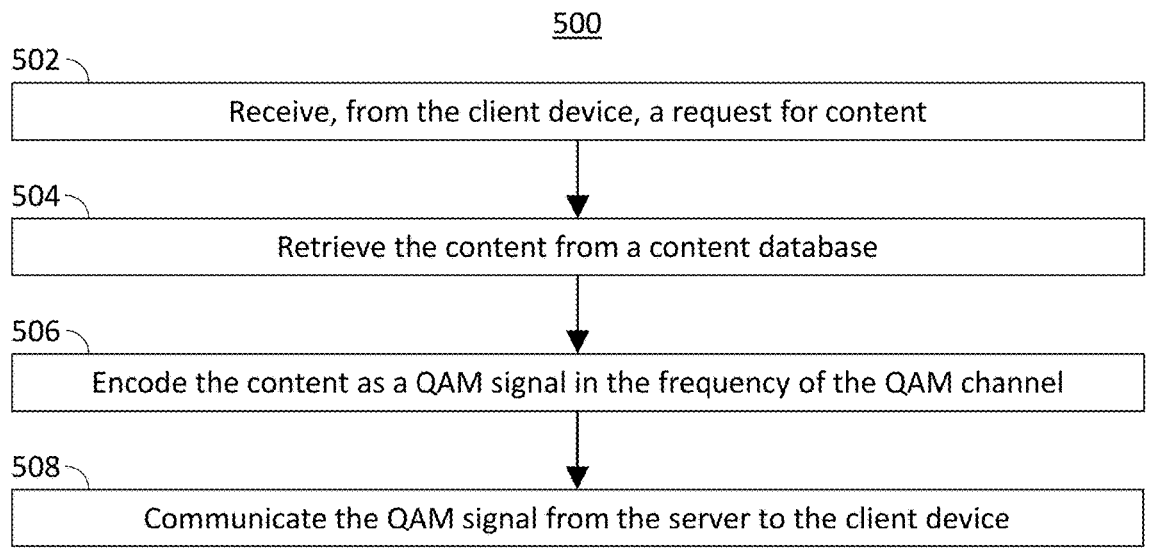
FIG. 5 is a flowchart presenting a process for communicating a QAM signal from a server to a client device, in accordance with some embodiments of the disclosure.

FIG. 5 is a flowchart representing an illustrative process 500 for communicating a QAM signal from a server to a client device, in accordance with some embodiments of the disclosure. Process 500 may be implemented on control circuitry of a master control server or any one or more of control circuitry 312, control circuitry 346, control circuitry 358, and control circuitry 394. In addition, one or more actions of process 500 may be incorporated into or combined with one or more actions of any process or embodiments described herein.

At 502, control circuitry (e.g., control circuitry 312 or control circuitry of a master control server) receives, from the client device, a request for content. For example, control circuitry may receive a request comprising a content identifier, a client device identifier, user authorization key, or any other data needed to establish a VOD session with the client device in which the requested content is transmitted to the client device in a unicast QAM signal.

At 504, control circuitry (e.g., control circuitry 312 or control circuitry of a master control server) retrieves the requested content from a content database. For example, control circuitry may generate a database query such as an SQL "SELECT" command using the identifier of the content received as part of the request, and may transmit the database query to a content database. In response to the query, control circuitry may receive the requested content from the content database. Alternatively, as the content item may be large (e.g., a 2-hour movie), the content database may be communicatively coupled to a streaming content server, which streams the requested content at a rate comparable to a rate at which control circuitry (e.g., control circuitry 312, control circuitry 390, or control circuitry of a master control server) can process the streamed content. At 506, control circuitry (e.g., control circuitry 394 or control circuitry of a master control server) encodes the content as a QAM signal in the frequency of the unicast QAM signal and, at 508, communicates the QAM signal to the client device.

The actions or descriptions of FIG. 5 may be used with any other embodiment of this disclosure. In addition, the actions and descriptions described in relation to FIG. 5 may be done in any suitable alternative orders or in parallel to further the purposes of this disclosure.

Figure 6:
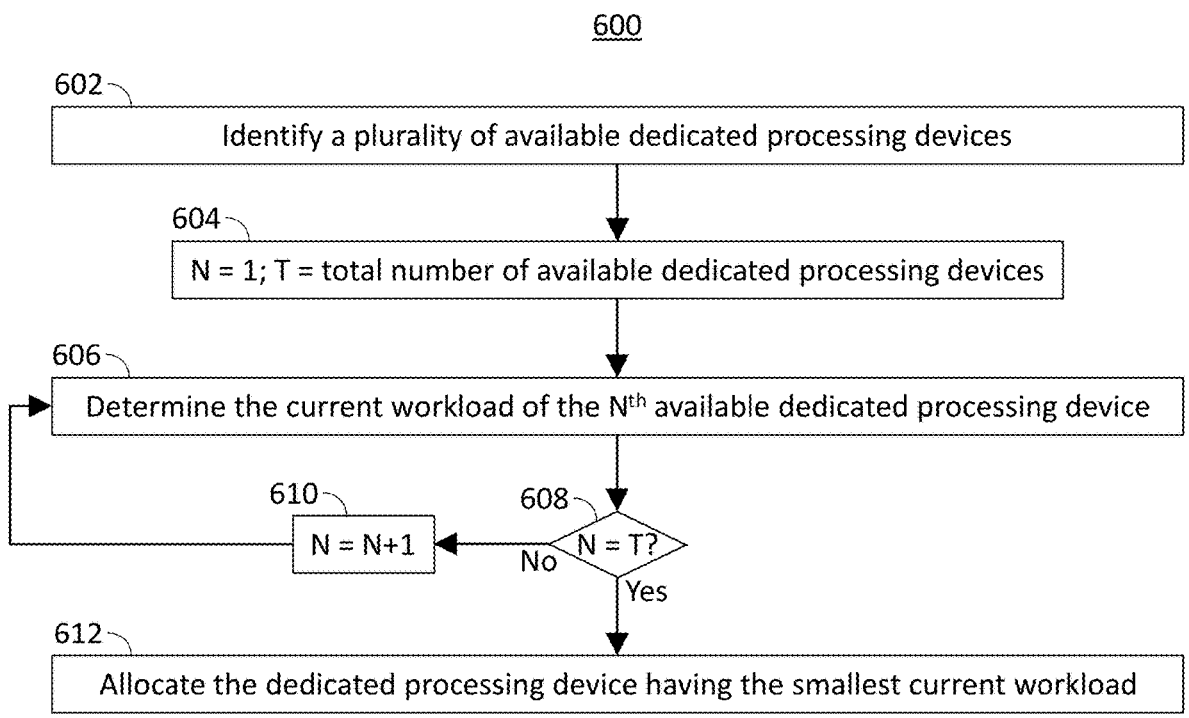
FIG. 6 is a flowchart representing a process for allocating a dedicated processing device to transcoding of supplemental content based on the current workload of each dedicated processing device, in accordance with some embodiments of the disclosure.

FIG. 6 is a flowchart representing an illustrative process 600 for allocating a dedicated processing device to transcoding of supplemental content based on the current workload of each dedicated processing device, in accordance with some embodiments of the disclosure. Process 600 may be implemented on control circuitry of a master control server or any one or more of control circuitry 312, control circuitry 346, control circuitry 358, and control circuitry 394. In addition, one or more actions of process 600 may be incorporated into or combined with one or more actions of any process or embodiments described herein.

At 602, control circuitry (e.g., control circuitry 346 or control circuitry of a master control server) identifies a plurality of available dedicated processing devices. For example, a cable headend may host a pool of dedicated processing devices (e.g., pool 200). Control circuitry may poll a controller of the pool or each individual dedicated processing device in the pool to determine the availability of each dedicated processing device.

At 604, control circuitry (e.g., control circuitry 346 or control circuitry of a master control server) initializes a counter variable N, setting its value to one, and a variable T representing the total number of available dedicated processing devices. At 606, control circuitry (e.g., control circuitry 346 or control circuitry of a master control server) determines the current workload of the $N^{th}$ dedicated processing device. For example, control circuitry may poll the $N^{th}$ processing device to determine the number of tasks currently allocated thereto, an amount of available processing power currently being used, an amount of RAM or other memory currently being used, or any other data suitable for establishing a metric of computer workloads. At 608, the control circuitry determines whether N is equal to T, meaning that the workload of each available dedicated processing device has been determined. If N is not equal to T ("No" at 608, then, at 610, the control circuitry increments the value of N by one, and processing returns to step 606. If N is equal to T ("Yes" at 608), then, at 612, the control circuitry allocates the dedicated processing device having the smallest current workload to the task of transcoding the supplemental content.

The actions or descriptions of FIG. 6 may be used with any other embodiment of this disclosure. In addition, the actions and descriptions described in relation to FIG. 6 may be done in any suitable alternative orders or in parallel to further the purposes of this disclosure.

Figure 7:
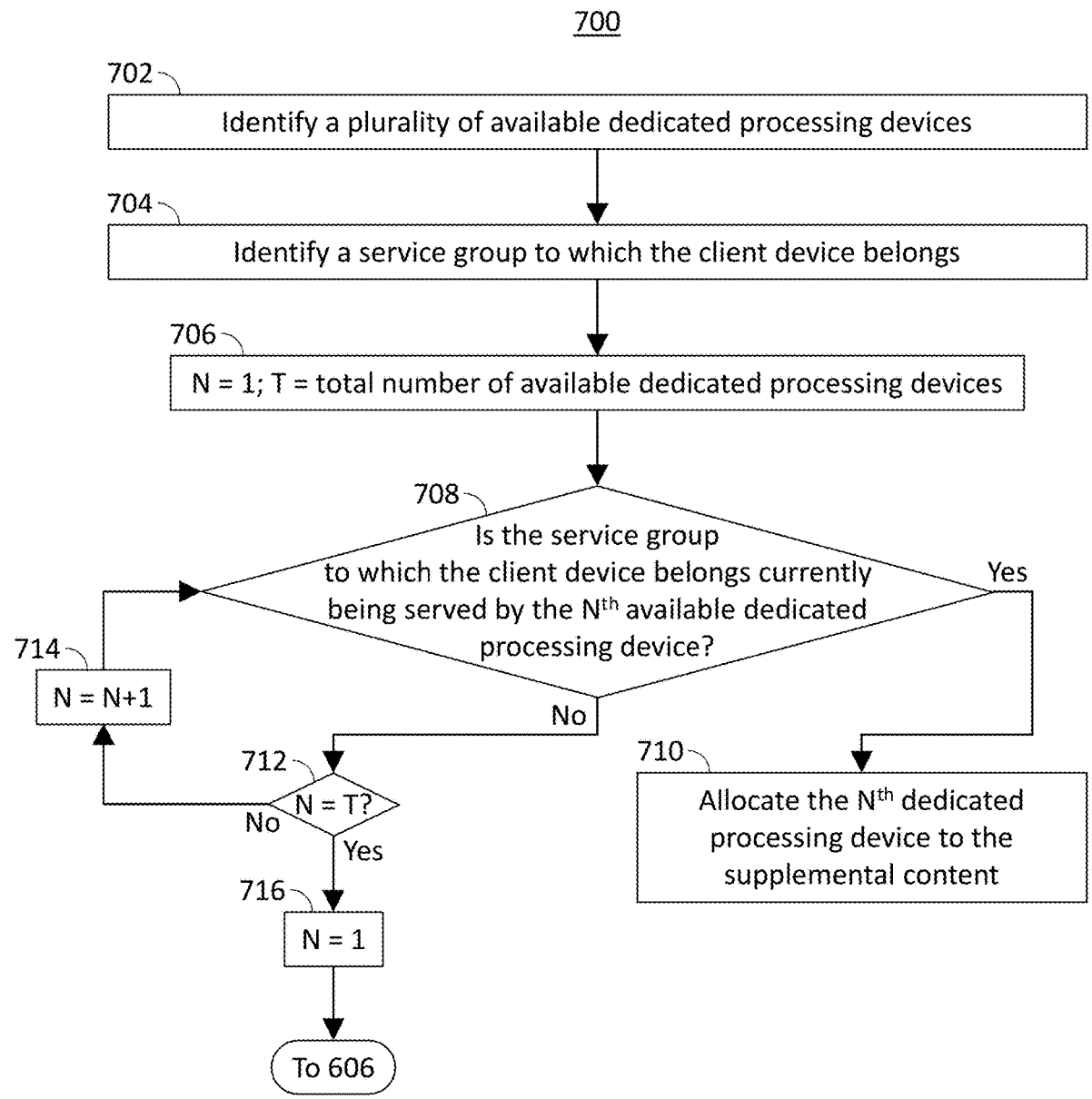
FIG. 7 is a flowchart representing a process for allocating a dedicated processing device to transcoding of supplemental content based on a service group of the client device, in accordance with some embodiments of the disclosure.

FIG. 7 is a flowchart representing an illustrative process 700 for allocating a dedicated processing device to transcoding of supplemental content based on a service group of the client device, in accordance with some embodiments of the disclosure. Process 700 may be implemented on control circuitry of a master control server or any one or more of control circuitry 312, control circuitry 346, control circuitry 358, and control circuitry 394. In addition, one or more actions of process 700 may be incorporated into or combined with one or more actions of any process or embodiments described herein.

At 702, control circuitry (e.g., control circuitry 346 or control circuitry of a master control server) identifies a plurality of available dedicated processing devices. This may be accomplished using methods described above in connection with FIG. 6. At 704, the control circuitry identifies a service group to which the client device belongs. For example, several client devices may be receiving unicast QAM signals of different VOD content simultaneously. The QAM channel used to transmit such VOD content can accommodate multiple VOD programs, each containing a unique program identifier, which is provided to each client device as part of the tuning information for the VOD program. The client devices receiving VOD programs on the same QAM channel are considered to be part of the same service group. The control circuitry identifies the service group of the client device, and therefore identifies the QAM channel, and the associated frequency, on which the VOD content is being transmitted and on which the supplemental content should be inserted.

At 706, control circuitry (e.g., control circuitry 346 or control circuitry of a master control server) initializes a counter variable N, settings its value to one, and a variable T representing a total number of available dedicated processing devices. At 708, the control circuitry determines whether the service group to which the client device belongs is currently being served by the $N^{th}$ available dedicated processing device. For example, the control circuitry may poll or query the $N^{th}$ processing device to determine the frequency or QAM channel on which its transcoded supplemental content is being transmitted and compare it with the QAM channel or frequency associated with the service group to which the client device belongs. If the $N^{th}$ available dedicated processing device is currently serving the service group to which the client device belongs ("Yes" at 708), then, at 710, the control circuitry allocates the $N^{th}$ available dedicated processing device to the supplemental content. If not ("No" at 708), then, at 712, the control circuitry determines whether N is equal to T, meaning that the service group being served by each available dedicated processing device has been identified. If not ("No" at 712), then, at 714, the control circuitry increments the value of N by one and processing returns to step 708. If N is equal to T, then the control circuitry may resort to the process described above in connection with FIG. 6 by, at 716, resetting the value of N to one, and proceeding to perform the steps of process 600, beginning with step 606.

The actions or descriptions of FIG. 7 may be used with any other embodiment of this disclosure. In addition, the actions and descriptions described in relation to FIG. 7 may be done in any suitable alternative orders or in parallel to further the purposes of this disclosure.

Figure 8:
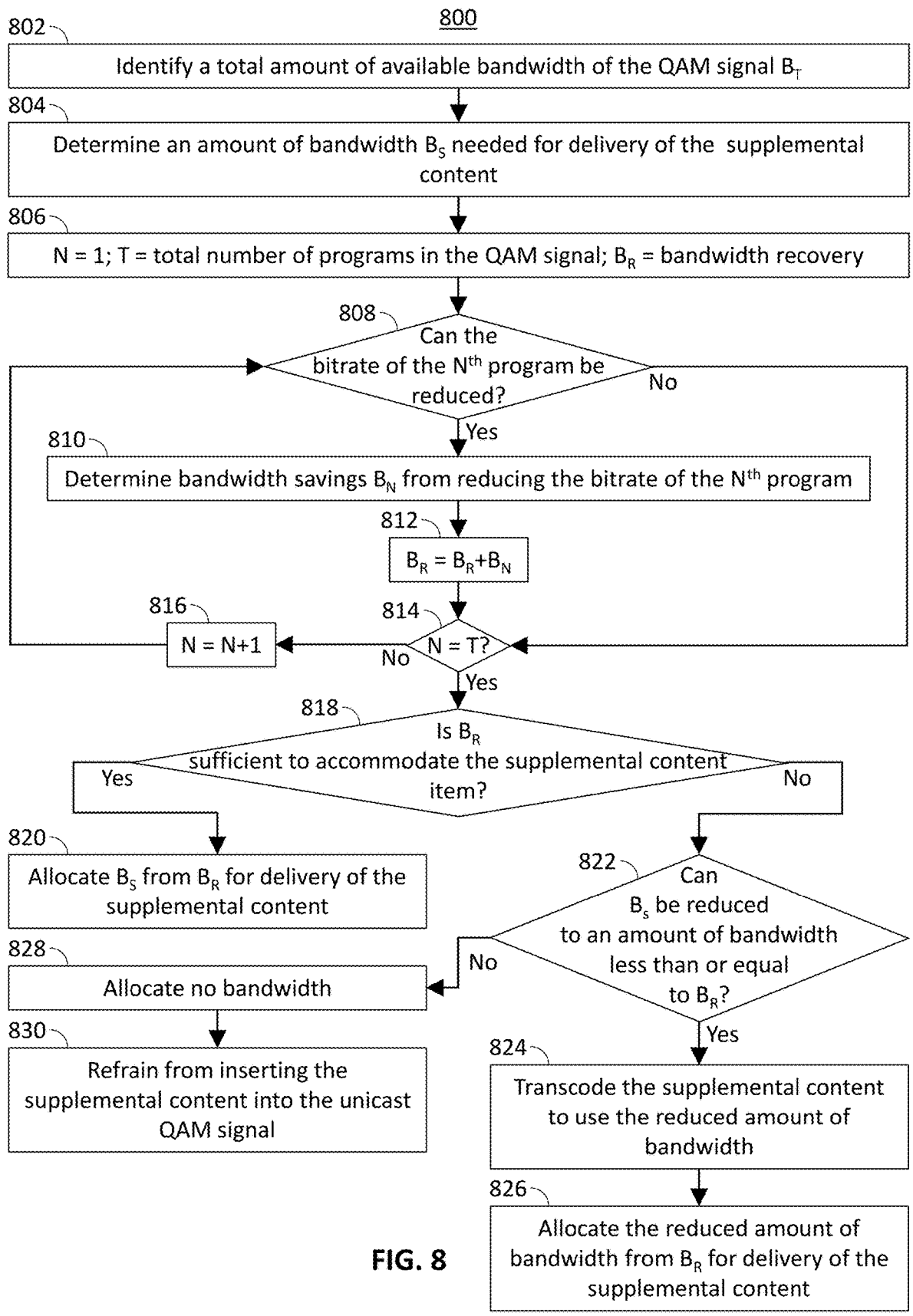
FIG. 8 is a flowchart representing a process for allocating a portion of available bandwidth of a QAM signal for delivery of supplemental content, in accordance with some embodiments of the disclosure.

FIG. 8 is a flowchart representing an illustrative process 800 for allocating a portion of available bandwidth of a QAM signal for delivery of supplemental content, in accordance with some embodiments of the disclosure. Process 800 may be implemented on control circuitry of a master control server or any one or more of control circuitry 312, control circuitry 346, control circuitry 358, and control circuitry 394. In addition, one or more actions of process 800 may be incorporated into or combined with one or more actions of any process or embodiments described herein.

At 802, control circuitry (e.g., control circuitry 346, control circuitry 358, or control circuitry of a master control server) identifies a total amount of available bandwidth of the QAM signal and assigns the value of a variable $B_T$ to the identified amount. This total amount of bandwidth is usually 6 MHz, but the amount of bandwidth available varies depending on the number of other VOD sessions being transmitted on the same QAM channel At 804, the control circuitry 804 determines an amount of bandwidth $B_S$ needed for delivery of the supplemental content. For example, the control circuitry may estimate the amount of bandwidth needed based on the volume of IP-formatted data representing the supplemental content. The control circuitry may also transcode the supplemental content into a QAM signal and determine the amount of bandwidth occupied by the transcoded QAM signal.

At 806, the control circuitry initializes a counter variable N, settings its value to one, a variable T representing the total number of programs in the QAM signal, and a variable $B_R$ representing the total bandwidth recovered from the QAM signal. At 808, the control circuitry determines whether the bitrate of the $N^{th}$ program can be reduced. For example, if the $N^{th}$ program comprises a video stream configured for 1080p resolution while the corresponding VOD session is configured to a lower resolution, such as 720p, a reduction in the bitrate of the $N^{th}$ program would be possible. Alternatively, the control circuitry may determine if a more efficient video codec can be applied to the content to reduce the amount of data, and consequently the bandwidth, needed to transmit the same quality of content. If the bitrate of the $N^{th}$ program can be reduced ("Yes" at 808), then, at 810, the control circuitry determines the bandwidth savings $B_N$ front he reduced bitrate of the $N^{th}$ program. At 812, the control circuitry adds the value of $B_N$ to $B_R$.

After adding the value of $B_N$ to $B_R$, or if the bitrate of the $N^{th}$ program cannot be reduced, at 814, the control circuitry determines whether N is equal to T, meaning that the ability to reduce the bitrate of each program in the QAM signal has been determined. If N is not equal to T ("No" at 814), then, at 816, the control circuitry increments the value of N by one, and processing returns to step 808. If N is equal to T ("Yes" at 814), then, at 818, the control circuitry determines whether $B_R$ is sufficient to accommodate the supplemental content item. If so ("Yes" at 818), then, at 820, the control circuitry allocates the amount of bandwidth needed for delivery of the supplemental content $B_S$ from the recovered bandwidth. If $B_R$ is insufficient to accommodate the supplemental content item ("No" at 818), then, at 822, the control circuitry determines whether $B_S$ can be reduced to an amount of bandwidth that is less than or equal to $B_R$. For example, the control circuitry may determine if the bitrate or frame rate of the supplemental content can be reduced in order to reduce the amount of bandwidth required. If $B_S$ can be reduced ("Yes" at 822), then, at 824, control circuitry (e.g., control circuitry 358 or control circuitry of a master control server) transcodes the supplemental content accordingly in order to use the reduced amount of bandwidth. At 826, the control circuitry allocates the reduced amount of bandwidth from $B_R$ for delivery of the supplemental content. Otherwise, if the bandwidth required for delivery of the supplemental content cannot be reduced ("No" at 822), then, at 828, the control circuitry allocates no bandwidth and, at 830, refrains from inserting the supplemental content into the unicast QAM signal. This prioritizes delivery of the VOD content over delivery of supplemental content such as advertisement during periods of highest activity.

The actions or descriptions of FIG. 8 may be used with any other embodiment of this disclosure. In addition, the actions and descriptions described in relation to FIG. 8 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    establishing a unicast quadrature amplitude modulation (QAM) signal between a server and a client device for delivery of content;
    identifying packetized supplemental content for delivery to the client device;
    determining an amount of bandwidth available for use within the unicast QAM signal;
    determining an amount of bandwidth needed for transmission of the packetized supplemental content in the unicast QAM signal;
    determining whether the amount of bandwidth needed for delivery of the packetized supplemental content is greater than the amount of bandwidth available for use within the unicast QAM signal;
    in response to determining that the amount of bandwidth needed for delivery of the packetized supplemental content is greater than the amount of bandwidth available for use within the unicast QAM signal, reducing a bit rate of the packetized supplemental content, thereby reducing an amount of data required to transmit the packetized supplemental content in the unicast QAM signal;
    transcoding the packetized supplemental content into a supplemental QAM signal; and
    inserting the supplemental QAM signal into the unicast QAM signal.

2. The method of claim 1, wherein establishing the unicast QAM signal comprises:
    receiving, from the client device, a request for the content;
    retrieving the content from a content database;
    encoding the content as a QAM signal in a frequency of the unicast QAM signal; and
    communicating the QAM signal from the server to the client device.

3. The method of claim 1, further comprising:
    receiving a signal from the client device to insert supplemental content.

4. The method of claim 1, further comprising:
    retrieving the packetized supplemental content; and
    allocating at least one of a plurality of dedicated processing devices to the packetized supplemental content.

5. The method of claim 4, wherein transcoding the packetized supplemental content comprises transcoding the packetized supplemental content using the at least one dedicated processing device.

6. The method of claim 4, wherein allocating the processing device to the packetized supplemental content comprises:
    identifying a plurality of available dedicated processing devices;
    determining a current workload of each of the plurality of available dedicated processing devices; and
    in response to determining that a current workload of a first dedicated processing device is less than a current workload of each other of the plurality of available processing devices, allocating the first dedicated processing device to the packetized supplemental content.

7. The method of claim 4, wherein allocating the at least one processing device to the supplemental content comprises:
    identifying a plurality of available dedicated processing devices;
    identifying a service group to which the client device belongs;
    determining whether the service group to which the client device belongs is currently being served by any of the plurality of dedicated processing devices; and
    in response to determining that the service group to which the client device belongs is currently being served by a first dedicated processing device of the plurality of available dedicated processing devices, allocating the first dedicated processing device to the packetized supplemental content.

8. The method of claim 1, wherein the content is media content, the method further comprising:
    causing the content transmitted over the unicast QAM signal to the client device to be played; and
    during delivery of the content, causing the packetized supplemental content to be played.

9. The method of claim 1, wherein the packetized supplemental content is a video file, and wherein reducing the bit rate of the packetized supplemental content comprises reducing an image resolution of the video file.

10. The method of claim 1, wherein the packetized supplemental content is a video file, and wherein reducing the bit rate of the packetized supplemental content comprises encoding the video file using a codec that reduces the bit rate of the packetized supplemental content.

11. A system comprising:
    a server; and
    control circuitry configured to:
        establish a unicast quadrature amplitude modulation (QAM) signal between a server and a client device for delivery of content;
        identify packetized supplemental content for delivery to the client device;
        determine an amount of bandwidth available for use within the unicast QAM signal;
        determine an amount of bandwidth needed for transmission of the packetized supplemental content in the unicast QAM signal;
        determine whether the amount of bandwidth needed for delivery of the packetized supplemental content is greater than the amount of bandwidth available for use within the unicast QAM signal;

in response to determining that the amount of bandwidth needed for delivery of the packetized supplemental content is greater than the amount of bandwidth available for use within the unicast QAM signal, reduce a bit rate of the packetized supplemental content, thereby reducing an amount of data required to transmit the packetized supplemental content in the unicast QAM signal;

transcode the packetized supplemental content into a supplemental QAM signal; and insert the supplemental QAM signal into the unicast QAM signal.

12. The system of claim 11, wherein the control circuitry is further configured to:
receive, from the client device, a request for the content;
retrieve the content from a content database;
encode the content as a QAM signal in a frequency of the unicast QAM signal; and
communicate the QAM signal from the server to the client device.

13. The system of claim 11, wherein the control circuitry is further configured to:
receive a signal from the client device to insert supplemental content.

14. The system of claim 11, wherein the control circuitry is further configured to:
retrieve the packetized supplemental content; and
allocate at least one of a plurality of dedicated processing devices to the packetized supplemental content.

15. The system of claim 14, wherein transcoding the packetized supplemental content comprises transcoding the packetized supplemental content using the at least one dedicated processing device.

16. The system of claim 14, wherein the control circuitry is further configured to:
identify a plurality of available dedicated processing devices;
determine a current workload of each of the plurality of available dedicated processing devices; and
in response to determining that a current workload of a first dedicated processing device is less than a current workload of each other of the plurality of available processing devices, allocate the first dedicated processing device to the packetized supplemental content.

17. The system of claim 14, wherein the control circuitry is further configured to:
identify a plurality of available dedicated processing devices;
identify a service group to which the client device belongs;
determine whether the service group to which the client device belongs is currently being served by any of the plurality of dedicated processing devices; and
in response to determining that the service group to which the client device belongs is currently being served by a first dedicated processing device of the plurality of available dedicated processing devices, allocate the first dedicated processing device to the packetized supplemental content.

18. The system of claim 11, wherein the control circuitry is further configured to:
cause the content transmitted over the unicast QAM signal to the client device to be played;
and during delivery of the content, cause the packetized supplemental content to be played.

19. The system of claim 11, wherein the packetized supplemental content is a video file, and wherein reducing the bit rate of the packetized supplemental content comprises reducing an image resolution of the video file.

20. The system of claim 11, wherein the packetized supplemental content is a video file, and wherein reducing the bit rate of the packetized supplemental content comprises encoding the video file using a codec that reduces the bit rate of the packetized supplemental content.

* * * * *